Sept. 11, 1951      J. E. JOHANSSON      2,567,486
POWER PLANT HAVING MEANS FOR AUTOMATICALLY
CHARGING THE ENGINE WITH SCAVENGING AIR
Filed Nov. 28, 1945
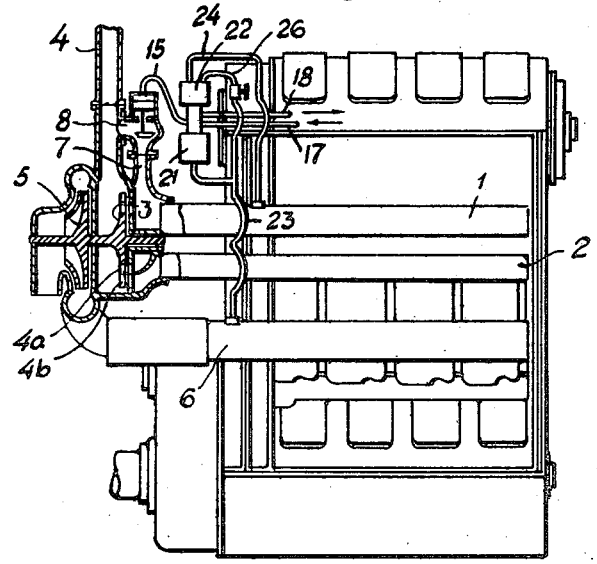
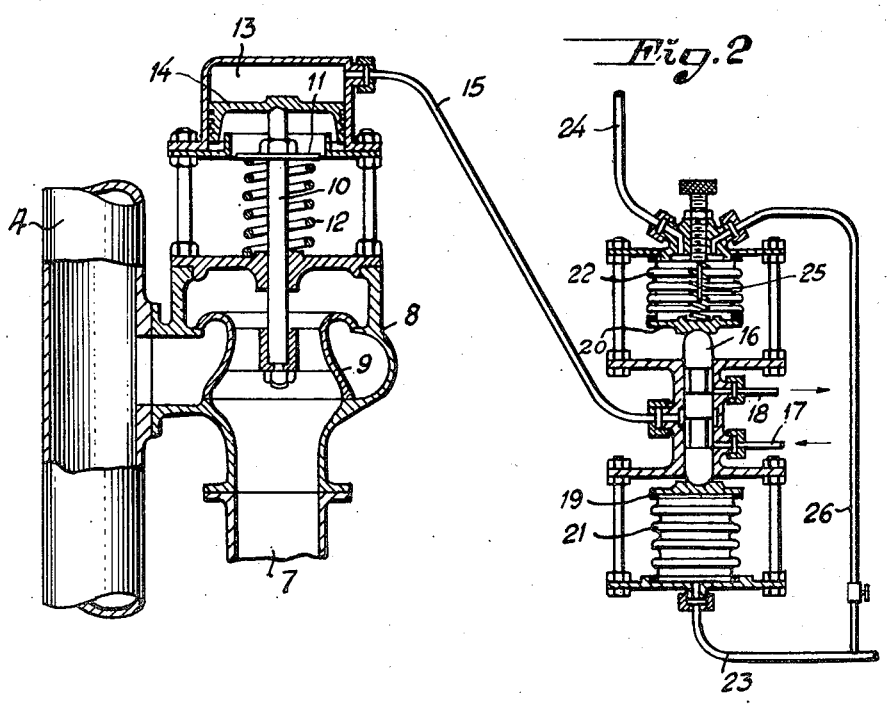

Patented Sept. 11, 1951

2,567,486

UNITED STATES PATENT OFFICE 2,567,486

POWER PLANT HAVING MEANS FOR AUTOMATICALLY CHARGING THE ENGINE WITH SCAVENGING AIR

Johan Erik Johansson, Gothenburg, Sweden, assignor to Aktiebolaget Götaverken, Gothenburg, Sweden, a corporation of Sweden Application November 28, 1945, Serial No. 631,378
In Sweden December 13, 1944

5 Claims. (Cl. 60—13)

1

The present invention relates to a power plant comprising an internal combustion engine, particularly a high speed engine, and a turbine driven by the exhaust gases from the engine and adapted to drive a compressor for scavenging and/or supercharging air for the engine, and in which the exhaust gas conduit of the engine or one of a plurality of exhaust gas conduits has a passage which is controlled by a by-pass valve and through which gases can be discharged into the atmosphere without being admitted to the turbine.

It is the primary object of the invention to provide a device that makes it possible automatically and in a favourable manner to charge the engine with the required scavenging air independent of great variations of the speed and engine load. If, for example, a sudden increase of the engine speed or engine load or both occurs under operation, a considerably increased quantity of exhaust gases is rapidly produced. At constant cross sections of flow in the turbine, the pressure rises ahead of the turbine, and a counter pressure will be set up in the exhaust gas conduit. In this case, it may even happen that the final pressure in the engine cylinders becomes so high that scavenging air cannot enter the cylinders. On account of the inertia of the turbine rotor and the compressor driven by the turbine, the compressor cannot suddenly be speeded up and compress the quantity of air required for the altered operating conditions at the required pressure. Due to the arrangement according to the invention, exhaust gases are temporarily discharged into the atmosphere such that a high counter pressure cannot be set up in the gas conduit, while the turbine, by means of the driving fluid supplied thereto, is gradually speeded up and yields an increasing output to the compressor. This condition is automatically maintained until a supply of air corresponding to the altered operating condition is obtained. The period of time between these operating conditions is very short. Consequently, the gas quantity discharged into the atmosphere will be relatively unimportant in the operation within high speed and load ranges.

The invention is hereinbelow described more in detail with reference to an embodiment illustrated in the accompanying drawing, in which:

Fig. 1 is a side elevation, partly in section, of an internal combustion engine arranged in accordance with the invention. Fig. 2 is a sectional view, to an enlarged scale, of an embodiment of constructional details of the arrangement.

2

Fig. 1 shows a multicylinder two-stroke internal combustion engine having an exhaust gas conduit I which is common to all of the cylinders and which is provided for exhaust products substantially finally expanded in the engine. Numeral 2 indicates an exhaust gas conduit likewise common to all of the cylinders and through which exhaust scavenging gases at a relatively high pressure are discharged from the various cylinders. The exhaust gas conduits I and 2 which hereinbelow are termed low pressure conduit and high pressure conduit, respectively, are connected to an exhaust gas turbine 3 which has different expansion stages 4a and 4b for the low pressure gases and high pressure gases, respectively. The turbine which is provided with an exhaust conduit 4, drives a compressor 5 which supplies scavenging and supercharging air to the cylinders by means of a scavenging air conduit 6. A by-pass conduit 7 which may be connected to the turbine exhaust conduit 4, connects the low pressure conduit I or an admission chamber of the turbine with the atmosphere. The conduit 7 is provided with a valve member 8 (Fig. 2) having a by-pass valve 9. In the embodiment shown, the valve is provided with a central passage and with double seats so that it is able rapidly to provide a large cross-sectional area for the flow of gases. The valve is connected with a stem 10 which has secured thereto a disc 11 on which acts a spring 12. The spring 12 rests against a stationary part of the valve casing and tends to open the valve 9. Above the valve, there is provided a servomotor cylinder 13 in which runs a piston 14 which abuts against the valve stem and which, under the influence of a pressure fluid in the cylinder 13, tends to close the valve. The cylinder 13 is supplied with fluid under pressure through a conduit 15 which by means of a slide valve 16 can be put into communication either with a conduit 17 for the supply of fluid under pressure or with an outlet conduit 18.

The slide valve 16 is on both sides acted upon by a disc 19 and 20, respectively, said discs constituting bottoms of diaphragm chambers 21 and 22, respectively. A conduit 23 connects the diaphragm chamber 21 with the scavenging air conduit 6. A conduit 24 connects the diaphragm chamber 22 with an exhaust conduit, such as the low pressure conduit I. The slide valve 16 is kept in normal position by the opposite forces acting upon both ends of the slide valve. In this position, the supply conduit 17 communicates with the cylinder 13 of the valve member. Since, in the embodiment shown, the pressure of the scavenging air is assumed to be higher than the pressure prevailing in the low pressure conduit 1, a spring 25 is provided which acts in the same direction as the gas pressure.

The mode of operation of the device described is as follows. If the engine speed or the engine load or both are rapidly increased to a considerable extent, the pressure in the low pressure conduit 1 as well as in the high pressure conduit 2 rises immediately. Consequently, an increase of pressure will occur in the diaphragm chamber 22. Since, for the reasons indicated above, a corresponding increase of the pressure of the air supplied by the compressor cannot occur immediately, the slide valve 16 will be displaced downwardly as viewed in Fig. 2, and communication between the conduits 15 and 18 will be established so that fluid under pressure will be discharged from the cylinder 13 of the valve member 8. As a result thereof, the valve 9 will be rapidly opened, and the low pressure gases will be discharged into the atmosphere without passing to the turbine. As a consequence thereof, the admission of scavenging air to the engine cylinders will not be hindered. Due to the increased pressure in the high pressure conduit 2, the speed of the turbine and, consequently, the amount of air supplied by the compressor will be increased, and after a short period of time, the pressure in the scavenging air conduit 6 will be increased to such an extent that the slide valve 16 will be returned to the position shown in the drawing in which the by-pass valve 9 is closed again. At the new engine speed, the pressures of the gases and the scavenging air will again counterbalance each other.

During the start of the engine, the low pressure conduit 1 should communicate with the atmosphere, since exhaust gases and scavenging air which are present in said conduit are likely to prevent scavenging of the engine at the low scavenging air pressure during the start. Since during the start the pressure of the air supplied by the compressor is low, the spring 25 can move the slide valve 16 to a lower position in which communication between the conduits 15 and 18 is established and, consequently, the by-pass valve 9 is in open position. When the pressure in the scavenging air conduit 6 has been increased to the required extent, the slide valve 16 will be moved to the position shown in the drawing, and the by-pass valve 9 will be closed. Consequently, low pressure gases will also be supplied to the turbine.

At low load on the engine and when the engine is idling, the difference between the pressure of the scavenging air and the low pressure gases becomes so small that the valve 9 will be opened for the discharge of gases.

A throttle conduit 26 of small cross-sectional area connects the air conduit 23 with the diaphragm chamber 22. Through this conduit, the diaphragm chamber 22 is filled with air, and variations in the gas pressure are transmitted to the diaphragm chamber by said air. The purpose of this arrangement is to prevent the exhaust gases from affecting the metal parts of the diaphragm chamber.

What I claim is:

1. A power plant comprising in combination, an internal combustion engine, a gas turbine having a high pressure stage and a low pressure stage, a first conduit for supplying exhaust products from said engine to the low pressure stage of said turbine, a second conduit for supplying to said high pressure stage exhaust products at a pressure higher than the pressure of said first-named exhaust products, an air compressor mechanically connected to said turbine, an air conduit for supplying compressed air from said compressor to said engine, a valve for putting said first conduit into communication with the atmosphere, a control device for said valve, means responsive to an increase of the pressure of said compressed air for actuating said control device to close said valve, and means responsive to an increase of the pressure of said exhaust gases for actuating said control device to open said valve.

2. A power plant comprising in combination, an internal combustion engine, a gas turbine, an exhaust conduit for supplying exhaust gases from said engine to said turbine, an air compressor mechanically connected to said turbine, an air conduit for supplying compressed air from said compressor to said engine, a valve for putting said exhaust conduit into communication with the atmosphere, a pressure responsive device connected to said valve, a pipe for supplying fluid under pressure to said device, a control member in said pipe, said control member being adapted alternatively to permit flow of fluid under pressure to said device and to relieve said device from fluid under pressure, means responsive to an increase of the pressure of said compressed air for moving said control member in a direction such as to close said valve, and means responsive to an increase of the pressure of said exhaust gases for moving said control member in a direction such as to open said valve.

3. A power plant comprising in combination, an internal combustion engine, a gas turbine, an exhaust conduit for supplying exhaust gases from said engine to said turbine, an air compressor mechanically connected to said turbine, an air conduit for supplying compressed air from said compressor to said engine, a valve for putting said exhaust conduit into communication with the atmosphere, a pressure responsive device connected to said valve, a pipe for supplying fluid under pressure to said device, a control member in said pipe, said control member being adapted alternatively to permit flow of fluid under pressure to said device and to relieve said device from fluid under pressure, means responsive to an increase of the pressure of said compressed air for moving said control member in a direction such as to close said valve, means responsive to an increase of the pressure of said exhaust gases for moving said control member in a direction such as to open said valve, and resilient means adapted to act upon said control member in the same direction as said last-named means.

4. A power plant comprising in combination, an internal combustion engine, a gas turbine, an exhaust conduit for supplying exhaust gases from said engine to said turbine, an air compressor mechanically connected to said turbine, an air conduit for supplying compressed air from said compressor to said engine, a valve for putting said exhaust conduit into communication with the atmosphere, a pressure responsive device connected to said valve, a pipe for supplying fluid under pressure to said device, a control member in said pipe, said control member being adapted alternatively to permit flow of fluid under pressure to said device and to relieve said device from fluid under pressure, a first diaphragm chamber communicating with said air conduit and adapted to move said control member in a direction such as to close said valve upon increase of the air pressure in said air conduit, and a second diaphragm chamber communicating with said exhaust conduit and adapted to move said control member in a direction such as to open said valve upon increase of the pressure of the exhaust gases in said exhaust conduit.

5. A power plant comprising in combination, an internal combustion engine, a gas turbine, an exhaust conduit for supplying exhaust gases from said engine to said turbine, an air compressor mechanically connected to said turbine, an air conduit for supplying compressed air from said compressor to said engine, a valve for putting said exhaust conduit into communication with the atmosphere, a pressure responsive device connected to said valve, a pipe for supplying fluid under pressure to said device, a control member in said pipe, said control member being adapted alternatively to permit flow of fluid under pressure to said device and to relieve said device from fluid under pressure, a first diaphragm chamber communicating with said air conduit and adapted to move said control member in a direction such as to close said valve upon increase of the air pressure in said air conduit, a second diaphragm chamber communicating with said exhaust conduit and adapted to move said control member in a direction such as to open said valve upon increase of the pressure of the exhaust gases in said exhaust conduit, and a pipe for restricted flow of compressed air from said air conduit to said second diaphragm chamber to create a clean air cushion of the same pressure as the pressure of the exhaust gases.

JOHAN ERIK JOHANSSON.

REFERENCES CITED

The following references are of record in the file of this patent:

UNITED STATES PATENTS

| Number | Name | Date |
|---|---|---|
| 2,005,821 | Büchi | June 25, 1935 |
| 2,373,139 | Morris | Apr. 10, 1945 |